United States Patent [19]

Stone

[11] 3,746,348

[45] July 17, 1973

[54] SEALING RING WITH RETAINING MEANS
[75] Inventor: John G. Stone, Los Angeles, Calif.
[73] Assignee: Parker-Hannifin Corporation, Cleveland, Ohio
[22] Filed: Jan. 15, 1971
[21] Appl. No.: 106,678

[52] U.S. Cl................................ 277/11, 285/DIG. 19
[51] Int. Cl.............................................. F16j 15/00
[58] Field of Search....................... 277/11, 207, 84, 277/95, 92; 285/DIG. 19

[56] References Cited
UNITED STATES PATENTS
| | | | |
|---|---|---|---|
| 3,524,654 | 8/1970 | Hasselbacker et al. | 277/92 |
| 3,542,377 | 11/1970 | Voitik | 277/207 |
| 949,658 | 2/1910 | Randall | 277/11 |

FOREIGN PATENTS OR APPLICATIONS
| | | | |
|---|---|---|---|
| 188,166 | 2/1956 | Austria | 277/11 |
| 1,230,222 | 3/1960 | France | 277/207 |

Primary Examiner—George E. Lowrance
Assistant Examiner—Robert I. Smith
Attorney—Oberlin, Maky, Donnelly & Renner

[57] ABSTRACT

A sealing ring such as an O-ring for flange type fittings and the like wherein the ring is axially squeezed in an annular chamber defined by the fitting parts, the ring having radially extending nubs which at their radial extremities have an interference fit with one of the radially spaced apart walls of the chamber thus to retain the ring in the chamber during assembly or disassembly of the parts and to coaxially locate the ring in the chamber in close proximity to that one of the radially spaced apart walls toward which fluid pressure tends to move the ring. The nubs are preferably of cylindrical form with rounded extremities and are of diameter less than the initial axial dimension of the ring so that, upon assembly, the ring is axially squeezed in its normal manner to form a fluid-tight joint without hindrance by the presence of the nubs.

8 Claims, 5 Drawing Figures

PATENTED JUL 17 1973  3,746,348
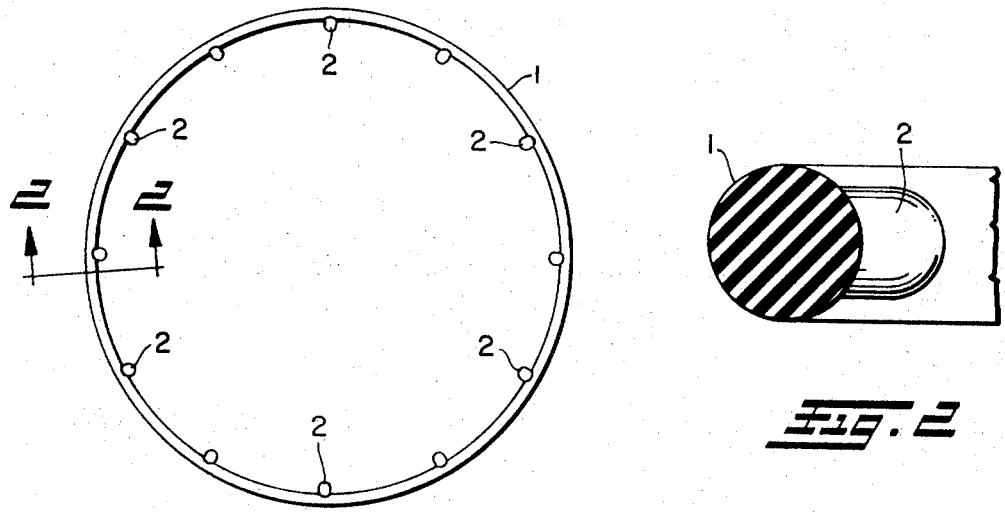
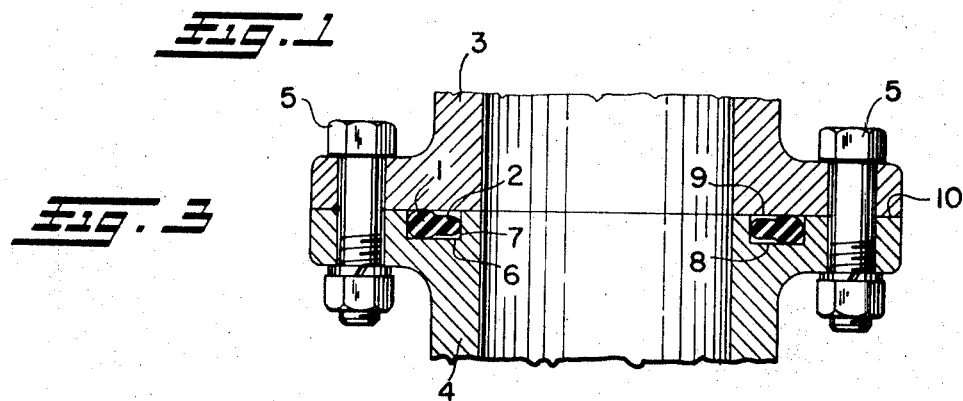
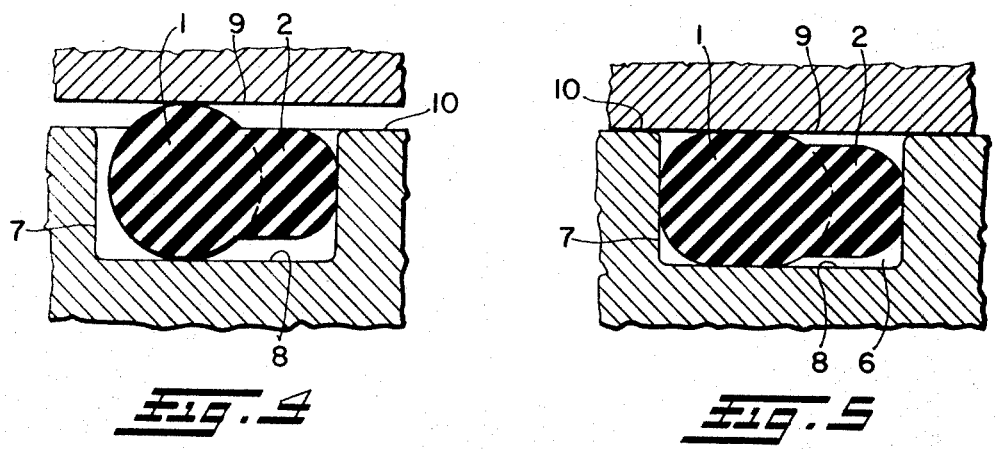
INVENTOR.
JOHN G. STONE
BY
Oberlin, Maky, Donnelly & Renner
ATTORNEYS

SEALING RING WITH RETAINING MEANS

BACKGROUND OF THE INVENTION

Static O-ring seals are in prevalent use in flanges, flange fittings, flange unions, cylinder end caps, valve covers, plugs etc. in which the mating parts have plane abutting faces, one of which is formed with a packing groove including radially spaced apart cylindrical walls and a flat bottom wall thus to define an annular chamber between the parts having axially and radially spaced apart walls. Generally, the radial cross-section diameter of the O-ring is from about 15 to 30 percent greater than the axial depth of the groove so that when the fitting parts are assembled in mating metal to metal contact substantial squeeze is applied on the O-ring to obtain a fluidtight joint. Also, the radial width of the groove is generally from about 35 to 55 percent wider than the radial cross-section diameter of the O-ring so that the volume of the packing ring chamber is greater than the volume of the O-ring and so that the O-ring may expand due to temperature increase. Another desirable relationship in joints of this type is that the outside diameter of the O-ring should be tangent to the outer cylindrical wall of the groove when fluid pressure tends to urge the O-ring outwardly, or the inside diameter of the O-ring should be tangent to the inner cylindrical wall of the groove when fluid pressure tends to force the O-ring inwardly, and in this way, the O-ring will not be subject to movement under variations in pressure.

However, because of tolerance variations in the O-ring itself and in the annular groove into which it is to be installed, there may be initial clearances which result in the assembly of the parts with the O-ring disposed in eccentric relation, whereby movement of the O-ring may occur when subject to fluid pressure. Furthermore, the loose O-ring may fall out of the groove.

SUMMARY OF THE INVENTION

It is accordingly, an object of this invention to provide a sealed joint employing a conventional static O-ring seal which has a series of circumferentially spaced, radially extending nubs which at their extremities have an interference fit with a cylindrical wall of the packing groove thus to retain the O-ring in the groove to facilitate assembly and disassembly of the joint forming parts, and to coaxially locate the O-ring in the packing groove with its outside diameter in close proximity to or tangent to the outer cylindrical wall of the packing groove or with its inside diameter in close proximity to or tangent to the inner cylindrical wall of the packing groove, depending on the direction in which fluid under pressure tends to move the ring in the assembled joint.

It is another object of this invention to provide an O-ring of the character indicated in which the radially extending nubs are widely spaced apart in a circumferential direction and are of less axial thickness than the O-ring so as not to interfere with the normal deformation of the O-ring when the joint parts are assembled to apply axial squeezing pressure on the O-ring.

Other objects and advantages of the present invention will appear hereinafter.

BRIEF DESCRIPTION OF THE DRAWING

FIG. 1 is a plan view of a preferred form of O-ring having retaining means;

FIG. 2 is a much enlarged radial cross-section view taken substantially along the line 2—2, FIG. 1;

FIG. 3 is a cross-section view of a flange fitting joint employing the present sealing ring in the annular packing chamber thereof;

FIG. 4 is a much enlarged radial cross-section view taken at the left side of FIG. 3 showing the sealing ring constituting the present invention disposed in the annular packing groove of one of the coupling members ready to be axially squeezed by the other one of said coupling members; and FIG. 5 is a cross-section view similar to FIG. 4 except showing the completed joint wherein the coupling members are secured together in mating metal to metal contact to form a fluid-tight joint therebetween by reason of axially squeezing the sealing ring between the axially spaced apart walls of the packing chamber defined between the coupling members.

DETAILED DESCRIPTION OF THE DRAWING

As shown in FIG. 1, the sealing ring 1 herein comprises a conventional O-ring which is molded from rubber-like resiliently deformable material to provide a plurality of circumferentially spaced apart, radially inwardly extending nubs 2 which preferably are cylindrical of smaller diameter than the radial cross-section diameter of the O-ring 1 and having rounded or hemispherical inner extremities.

As shown in FIG. 3, the coupling members 3 and 4 are secured together by nuts and bolts 5 and define therebetween a packing ring chamber 6. One coupling member 4 has an annular groove 7 therein, the sides of which form radially spaced apart walls of the chamber 6 and the bottom 8 of which forms one of the axially spaced apart plane end walls of the chamber 6, the other end wall 9 being defined by the plane end face of the coupling member 3 which is secured in metal to metal contact with the plane end face 10 of the coupling member 4 when the bolts and nuts 5 are tightened.

The radially inner extremities of the nubs 2 lie in a circle which is coaxial with the axis of the O-ring 1 and which is of diameter smaller than the diameter of the radially inner cylindrical wall of the packing groove 7 whereby when the sealing ring 1 is assembled in the groove as shown in FIG. 4, the interference fit between the nubs 2 and the inner cylindrical wall of the packing groove 7 will serve to retain the sealing ring 1 in the groove 7 and will serve to coaxially locate the O-ring 1 in the groove 7 so that its outside diameter is in close proximity to, or tangent to the outer cylindrical wall of the groove 7.

When the coupling members 3 and 4 are drawn together, the O-ring 1 is axially squeezed between the axially spaced apart walls 8 and 9 of the chamber 6 to more or less oval cross-section form as shown in FIG. 5 to establish fluid-tight contact with the walls 8 and 9 and during such axial squeezing of the O-ring there may be a tendency of the same to radially expand against the radially outer cylindrical wall of the groove 7. It is to be noted that because the nubs 2 are of smaller diameter than the radial cross-section diameter of the O-ring 1 they do not to any material extent interfere with the normal axial squeezing operation of the O-ring 1 so that a fluid-tight joint is obtained between the coupling members 3 and 4. In the event that the radial width of the packing groove 7 is less than the distance from the outside diameter of the O-ring 1 to the inside diameter of the nubs 2, the portions of the sealing ring 1 at the nubs 2 will be subjected to slight radial compressing action between the radially spaced apart walls of the packing groove 7, but this again will be ineffective to alter the normal operation of the O-ring 1 when axially squeezed in the chamber 6 defined between the coupling members 3 and 4.

In the installation shown in FIG. 3, the pressure within the coupling members 3 and 4 tends to force the O-ring 1 outwardly and therefore the outside diameter of the O-ring 1 should initially be in close proximity to or in contact with the radially outer wall of the groove 7. In the event that predominant fluid pressure is outside the coupling members 3 and 4 (as in a vacuum system, for example), then the O-ring 1 should be in close proximity to or in contact with the radially inner wall of the groove 7 and the nubs 2 should extend radially outwardly from the O-ring so as to have an interference fit with the radially outer cylindrical wall of the groove 7.

I, therefore, particularly point out and distinctly claim as my invention:

1. A sealed joint comprising a pair of coupling members and means securing them together in abutting contact to define therebetween an annular chamber of predetermined size including radially and axially spaced apart walls; and a sealing ring of resiliently deformable material axially squeezed in said chamber between said axially spaced apart walls into sealed engagement with the respective coupling members, said sealing ring having a volume which is less than that of said chamber and having a plurality of radially extending circumferentially spaced apart nubs, the extremities of which in the relaxed condition of said sealing ring lie on a circle concentric with said ring and have an interference fit with one of said radially spaced apart walls whereby during assembly and disassembly of said coupling members said ring is frictionally retained in the portion of said chamber which contains said one of said radially spaced apart walls, the axial thickness of said nubs being less than the axial thickness of said ring prior to axial squeezing thereof in said chamber whereby, during assembly of said coupling members, said ring is axially squeezed primarily circumferentially around such axially thicker portion rather than at said nubs, said ring, upon axial squeezing thereof between said axially spaced apart walls, having its side opposite to said nubs in contact with the other one of said radially spaced apart walls whereby dominant fluid pressure on the nub side of said ring is ineffective to radially move said ring in said annular chamber.

2. The sealed joint of claim 1 wherein said annular chamber is essentially of rectangular cross-section; and wherein said sealing ring is of circular radial cross-section except at the locations of said nubs, said ring being squeezed to generally oval shaped radial cross-section between the axially spaced apart walls of said chamber.

3. The sealed joint of claim 1 wherein said nubs extend radially inwardly from said sealing ring to contact the radially inner one of said radially spaced apart walls.

4. The sealed joint of claim 3 wherein said ring, when disposed in said chamber, has its outside diameter in contact with the radially outer one of said radially spaced apart walls.

5. A sealing ring of rubber-like resiliently deformable material comprising a portion of circular radial cross-section adapted to be axially squeezed to generally oval cross-section in a packing chamber having axially and radially spaced apart walls with one side of said oval cross-section in contact with one of said radially spaced apart walls; and circumferentially spaced apart, radially extending nub portions on the other side of said portion integral with said portion adapted at their radial extremities to have an interference fit with the other one of said radially spaced apart walls prior to axial squeezing of said portion; said nub portions having radially extending axes which lie in a plane perpendicular to the axis of said sealing ring and which pass diametrically through the axial middle of said portion, and said nub portions being of axial thickness less than the radial cross-section diameter of said portion so as not to impede axial squeezing of said portion to oval cross-section.

6. The sealing ring of claim 5 wherein said nub portions extend radially inwardly of said portion.

7. The sealing ring of claim 5 wherein said nub portions are cylindrical with rounded extremities to facilitate installation of said ring into such chamber with the extremities of said nub portions frictionally engaging said other one of the radially spaced apart walls.

8. A sealed joint comprising a pair of coupling members and means securing them together in abutting contact to dedefine therebetween an annular chamber of predetermined size including radially and axially spaced apart walls; and a sealing ring of resiliently deformable material axially squeezed in said chamber between said axially spaced apart walls into sealed engagement with the respective coupling members, said sealing ring having a volume which is less than that of said chamber and having a plurality of radially extending circumferentially spaced apart nubs which are of generally cylindrical form with radially extending axes and with rounded radial extremities, said extremities lying on a circle concentric with said ring and having an interference fit with one of said radially spaced apart walls whereby during assembly and disassembly of said coupling members said ring is frictionally retained in the portion of said chamber which contains said one of said radially spaced apart walls, the axial thickness of said nubs being less than the axial thickness of said ring prior to axial squeezing thereof in said chamber whereby, during assembly of said coupling members, said ring is axially squeezed primarily circumferentially around such axially thicker portion rather than at said nubs, said ring, upon axial squeezing thereof between said axially spaced apart walls, having its side opposite to said nubs in contact with the other one of said radially spaced apart walls whereby dominant fluid pressure on the nub side of said ring is ineffective to radially move said ring in said annular chamber.

* * * * *